United States Patent
Borra et al.

(10) Patent No.: US 8,444,280 B2
(45) Date of Patent: May 21, 2013

(54) MAGNETICALLY DEFORMABLE FERROFLUIDS AND MIRRORS

(75) Inventors: Ermanno Borra, Québec (CA); Jean-Philippe Déry, Québec (CA); Stéphanie Senkow, Saint-Rédempteur (CA); Anna Ritcey, Québec (CA)

(73) Assignee: Universite Laval, Quebec (CA)

( * ) Notice: Subject to any disclaimer, the term of this patent is extended or adjusted under 35 U.S.C. 154(b) by 573 days.

(21) Appl. No.: 12/597,445

(22) PCT Filed: Apr. 24, 2008

(86) PCT No.: PCT/CA2008/000767
§ 371 (c)(1),
(2), (4) Date: Jun. 16, 2010

(87) PCT Pub. No.: WO2008/131528
PCT Pub. Date: Nov. 6, 2008

(65) Prior Publication Data
US 2010/0277820 A1    Nov. 4, 2010

Related U.S. Application Data

(60) Provisional application No. 60/913,820, filed on Apr. 25, 2007.

(51) Int. Cl.
*G02B 7/182* (2006.01)
(52) U.S. Cl.
USPC ................................. 359/878; 252/62.52
(58) Field of Classification Search
USPC .................................... 252/62.52
See application file for complete search history.

(56) References Cited

U.S. PATENT DOCUMENTS

| 669,119 A | 3/1901 | Krank |
| 3,010,153 A | 11/1961 | Bittner |

(Continued)

FOREIGN PATENT DOCUMENTS

| EP | 0328497 A1 | 8/1989 |
| EP | 1361585 | 11/2003 |

(Continued)

OTHER PUBLICATIONS

Brousseau, D.; Borra, E. F.; Jean-Ruel, H.; Parent, J.; Ritcey, A., A magnetic liquid deformable mirror for high stroke and low order axially symmetrical aberrations, Optics Express (2006), vol. 14, 11486.

(Continued)

*Primary Examiner* — Jennifer L. Doak
(74) *Attorney, Agent, or Firm* — Sutherland Asbill & Brennan LLP

(57) ABSTRACT

There is provided a process for the preparation of a suspension of magnetic particles in a polar carrier liquid. The process includes the step of: coating the surface of the magnetic particles with an organic ligand having a hydrophilic chain prior to the suspension. For preparing a magnetically deformable mirror, the suspension of magnetic particles in a polar carrier liquid is coated with a reflective surface layer. A ferrofluid includes a suspension of magnetic particles coated with an organic ligand having a hydrophilic chain in a polar carrier liquid.

26 Claims, 10 Drawing Sheets

U.S. PATENT DOCUMENTS

| | | | |
|---|---|---|---|
| 4,076,387 | A | 2/1978 | Haas et al. |
| 4,329,241 | A | 5/1982 | Massart |
| 5,240,626 | A | 8/1993 | Thakur et al. |
| 5,650,880 | A | 7/1997 | Shuter et al. |
| 5,954,991 | A | 9/1999 | Hong et al. |
| 6,249,271 | B1 | 6/2001 | Albert et al. |
| 6,323,989 | B1 | 11/2001 | Jacobson et al. |
| 6,538,801 | B2 | 3/2003 | Jacobson et al. |
| 6,631,032 | B2 | 10/2003 | Ryutov et al. |
| 6,721,083 | B2 | 4/2004 | Jacobson et al. |
| 6,945,658 | B2 | 9/2005 | Borra et al. |
| 7,297,290 | B2 * | 11/2007 | Fuchs et al. ............... 252/62.54 |
| 2003/0227695 | A1 | 12/2003 | Borra et al. |
| 2004/0008430 | A1 | 1/2004 | Borra et al. |
| 2004/0033345 | A1 | 2/2004 | Dubertret et al. |
| 2006/0286379 | A1 | 12/2006 | Gao |

FOREIGN PATENT DOCUMENTS

| | | |
|---|---|---|
| FR | 2461521 | 2/1981 |
| FR | 2662539 | 11/1991 |
| JP | 06061032 A2 | 3/1994 |
| WO | 2006025627 A1 | 3/2006 |

OTHER PUBLICATIONS

Laird, P.; Borra, E. F.; Bergamasco, R.; Gingras, J.; Truong, L.; Ritcey, A., "Deformable Mirrors Based on Magnetic Liquids", Proceedings of SPIE (2004), vol. 5490, 1493.

Gingras J.; Déry J.-P.; Yockell-Lelièvre H.; Borra E.; Ritcey A.M., "Surface films of silver nanoparticles for new liquid mirrors", Colloids and Surfaces A: Physicochemical and Engineering Aspects 279 (2006) 79-86.

Yogev D.; Efrima S.; J. Phys. Chem. (1988), 92, 5754-5760.

Gordon K.C.; McGarvey J.J.; Taylor K.P.; "Enhanced Raman Scattering from "Liquid Metal" Films Formed from Silver Sols", J. Phys. Chem. (1989) 93, 6814-6817.

Borra E.F.; Brousseau D.; Gagné G.; Faucher L.; Ritcey A.M.; "Nanoengineered Parabolic Liquid Mirrors", Proceedings of SPIE, vol. 6273, 627300-1 (2006).

Gagné G.; Borra E.F.; Ritcey A.M.; "Tiltable rotating liquid mirrors: a progress report", Astronomy & Astrophysics, 479, 597-602 (2008).

Zins, D.; Cabuil, V; Massart, R.; "New aqueous magnetic fluids", Journal of Molecular Liquids, 83 (1999) 217-232.

Berger, P.; Adelman, N. B.; Beckman, K. J.; Campbell, D. J.; Ellis, A. B.; Lisensky G.C., "Preparation and Properties of an Aqueous Ferrofluid", Journal of Chemical Education, vol. 76 (1999), 943.

Dubois E.; Cabuil V.; Boué F.; Perzynski R.; "Structural analogy between aqueous and oily magnetic fluids," Journal of Chemical Physics, (1999) vol. 111, No. 15.

Massart R.; Bacri J.-C.; Perzynski R.; "Liquides magnétiques ou ferrofluides", Technique de l'Ingénieur, (1995) D 2 180, 1-10.

Atarashi, T.; Kim, Y.S; Fujita, T.; Nakatsuka, K.; "Synthesis of ethylene-glycol-based magnetic fluid using silica-coated iron particle", Journal of Magnetism and Magnetic Materials, (1999), 201, 7-10.

Tourinho F.A.; Franck, R.; Massart R.; "Aqueous ferrofluids based on manganese and cobalt ferrites" J. Mater. Sci 25 (1990) 3249-3254.

Bee A.; Massard R.; Neveu S.; "Synthesis of very fine maghemite particles", Journal of Magnetism and Magnetic Materials, (1995) 149, 6-9.

Massart, R. IEEE, "Transactions on Magnetics", (1981), vol. MAG-17, No. 2, 1247.

Laird, P.; ,Caron, N.; Rioux, M.; Borra, E. F.; Ritcey, A.; "Ferrofluidic adaptive mirrors", Applied Optics, (2006), vol. 45, No. 15, 3495.

Allara, D.L.; Nuzzo, R. G.; "Spontaneously Organized Molecular Assemblies. 1. Formation, Dynamics, and Physical Properties of n-Alkanoic Acids adsorbed from Solution on an Oxidized Aluminum Surface", Langmuir (1985), 1, 45-52.

Willis A.L.; Turro, N. J.; O'Brien, S.; "Spectroscopic Characterization of the Surface of Iron Oxide Nanocrystals", Chem. Mater. (2005), 17, 5970-5975.

Tao, Y. T., "Structural Comparison of Self-Assembled Monolayers of n-Alkanoic Acids on the Surfaces of Silver, Copper, and Aluminum", J. Am. Chem. Soc. (1993), 115, 4350-4358.

Maity, D.; Agrawal, D. C.; "Synthesis of iron oxide nanoparticles under oxidizing environment and their stabilization in aqueous and non-aqueous media", Journal of Magnetism and Magnetic Materials, 308 (2007) 46-55.

Chantrell, R.W.; Bradbury, A.; Popplewell, J.; Charles, S.W., "Agglomerate formation in a magnetic fluid", J. Appl. Phys., (1982), 53 (3), 2742.

Kiryushin, V. V.; Nazarenko, A. V.; "Interaction of a magnetic liquid with a conductor containing current and a permanent magnet", Fluid Dyn. (1988), 23, 306.

Hasmonay, E.; Bee, A.; Bacri, J.-C.; Perzynski, R., "pH Effect on an Ionic Ferrofluid: Evidence of a Thixotropic Magnetic Phase", J., Phys. Chem. B (1999), 103, 6421-6428.

Borra E.F.; Ritcey A.M., Artigau E.; "Floating Mirrors", Astrophysical Journal Letters, (1999), 516, L115.

P.C. Lee; PC.; Meisel D., "Adsorption and Surface-Enhanced Raman of Dyes on Silver and Gold Sols" J. Phys Chem, (1982), 86, 3391.

Borra E F.; Ritcey A M : "Tiltable Liquid Mirror Telescopes", Proceedings of SPIE vol. 4003 (2000), 331-336.

Shutter W. L.H.; Whitehead L. A.; "A wide sky coverage Ferrofluid Mercury Telescope", Astrohysical Journal Letters (1994), L139-L141, vol. 418.

Ragazzoni, R; Marchetti, E. "A Liquid Adaptive Mirror", Astronomy and Astrophysics, (1994), L17-L19, vol. 283.

Raggazzoni, R.; Marchette, E., Claudi, R.u.; "Magnetic Driven Liquid Mirrors in Orbiting Telescopes" Astronomy and Astrophysics Supplement Series; (1996) 175-179.

Cugat O.; Basrour S.; Divoux C.; Mounaix P.; Reyne; "Deformable Magnetic Mirror for Adaptive Optics: Technological Aspects", Sensors and Actuators, A 89 (2001) 1-9.

Gwan Soo Park, "Determination of the curvature of the magnetic fluid under the external forces", IEEE transactions on magnetics, vol. 38, No. 2, (2002) 957.

Shafi, K. V.P.M.; Ulman, A.; Yan, X.;Yang N-L.; Estournès ,C.; White, H.; Rafailovich; "Sonochemical Synthesis of Fuctionalized Amorphous Iron Oxide Nanoparticles", Langmuir (2001), 17, 5093-5097.

Boal, A.K.; Das, K.; Gray, M.; Rotello, V., "Monolayer Exchange Chemistry of y-Fe2O3 Nanoparticles", Chem. Mater. (2002), 14, 2628-2636.

Nakamoto, K.; "Infrared and Raman spectra of inorganic and coordination compouds" John Wiley and Sons; New York, (1997), 230-233.

Nakamoto, K.; McCarthy, P.J. "Spectroscopy and Structure of Metal Chelate Compounds", John Wiley and Sons; New York, (1965), 268-277.

\* cited by examiner

MAGNETICALLY DEFORMABLE FERROFLUIDS AND MIRRORS

CROSS-REFERENCE TO RELATED APPLICATIONS

This application claims priority under 35 USC §119(e) of U.S. provisional patent application 60/913,820 filed on Apr. 25, 2007, the specification of which is hereby incorporated by reference. This application is a national phase of PCT patent application serial number PCT/CA2008/000767 filed Apr. 24, 2008, designating the United States, now pending, the specification of which is hereby incorporated by reference.

TECHNICAL FIELD

The present invention relates to ferrofluids and, more particularly, to ferrofluids which are compatible with a reflective layer deposited on their surface to render them reflective. It also relates to magnetically deformable mirrors including a ferrofluid layer and a thin reflective surface film of reflective nanoparticles.

BACKGROUND OF THE INVENTION

Ferrofluids are colloidal dispersions (or suspensions) of magnetic nanoparticles in a liquid carrier that combine fluidic and magnetic properties to yield magnetically deformable liquids. Ferrofluids are well known and have many industrial applications including seals, coolants for loudspeakers and inks for printers.

More recently, ferrofluids have been employed for the fabrication of a new kind of deformable liquid mirror (Brousseau, D.; Borra, E. F.; Jean-Ruel, H.; Parent, J.; Ritcey, A. *Opt. Express* 2006, 14, 11486, and Laird, P.; Borra, E. F.; Bergamesco, R.; Gingras, J.; Truong, L.; Ritcey, A. *Proc. SPIE* 2004, 5490, 1493). Application of a current through a conducting liquid generates magnetic fields so that the liquid can respond to the force resulting from an externally applied magnetic field. By using a magnetic field, it is possible to shape the surface of ferrofluids and thus of the resulting liquid mirrors.

Since ferrofluids are not highly reflective, this application requires that they be coated with a reflective layer for mirror applications. Surface films of silver nanoparticles for coating ferrofluids are typically based on reflective liquid-like films and denoted as MELLFs (for Metal Liquid-Like Films) (Yogev, D.; Efrima, S.; *J. Phys. Chem.* 1988, 92, 5754).

To achieve a stable suspension of magnetic particles in the liquid carrier, stabilizing/dispersing agents are used to prevent particle aggregation and sedimentation. The choice of the stabilizing/dispersing agent depends on the nature of the liquid carrier in which the particles are dispersed. Ferrofluids composed of non-polar solvent, such as oils, usually include organic molecules containing relatively long alkyl chains, such as oleic acid, as the dispersing agent (E. Dubois, V. Cabuil, F. Boué and R. Perzynski, "Structural analogy between aqueous and oily magnetic fluids," J. Chem. Phys., Vol. 111, No. 15, (1999)). When anchored to the particle surface, the organic tails prevent the aggregation of the magnetic particles by introducing steric repulsion.

In known preparations in polar media, particle aggregation is prevented by electrostatic stabilization achieved through the introduction of surface charges with methods analogous to those developed for aqueous ferrofluids. Typical procedures employ the surface adsorption of citrate (Dubois, E.; Cabuil, V.; Boué F.; Perzynski, R. *J. Chem. Phys.* 1999, 111, 7147) or hydroxide (Tourinho, F. A.; Franck, R.; Massart, R. *J. Mater. Sci.* 1990, 25, 3249) ions to produce negatively charged particles. As described below, ethylene glycol based ferrofluids stabilized in this way are not compatible with the reflective surface films of silver nanoparticles. The reflective layer gradually cracks and flocculates to the bottom of the container when deposited on a ferrofluid containing citrate-coated nanoparticles.

A relatively large number of organic ligands, including, for example, fatty acids (Dubois, E.; Cabuil, V.; Boué, F.; Perzynski, R. J. Chem. Phys 1999, 111, 7147), ionic surfactants (Massart, R.; Neveu, S.; Cabuil-Marchal, V.; Brossel, R.; Fruchart, J.-M.; Bouchami, T.; Roger. J.; Bee-Debras, A.; Pons, J-N.; Carpentier, M. Procédé d'obtention de supports magnétiques finement divisés par modification contrôlée de la surface de particules précurseurs magnétiques chargées et produits obtenus. French Patent 2,662,539, May 23, 1990) (Shafi, K. V. P. M.; Ulman, A.; Yan, X.; Yang N-L.; Estournès, C.; White, H.; Rafailovich, M. Langmuir 2001, 17, 5093), amines and alcohols (Boal, A. K.; Das, K.; Gray, M.; Rotello, V. Chem. Mater. 2002, 14, 2628.) have been investigated as stabilizing agents for magnetic nanoparticles. In all cases, however, these ligands were employed to enable particle dispersion in organic media. Particle stabilization in polar carrier liquids, such as water or ethylene glycol, has been achieved rather through the introduction of surface charges. In known preparations, particle aggregation is prevented by electrostatic stabilization employing the surface adsorption of citrate (Dubois, E.; Cabuil, V.; Boué F.; Perzynski, R. *J. Chem. Phys.* 1999, 111, 7147) or hydroxide (Tourinho, F. A.; Franck, R.; Massart, R. *J. Mater. Sci.* 1990, 25, 3249).ions to produce negatively charged particles. Bilayers of ionic surfactants have also been reported to provide electrostatic stabilization through the outer layer of charged head groups surrounding the particles (Maity, D.; Agrawal, D. C. *J. Magn. Magn. Mater.* 2007, 308, 46.)

SUMMARY OF THE INVENTION

It is therefore an aim of the present invention to address the above mentioned issues.

According to a general aspect, there is provided a process for the preparation of a suspension of magnetic particles in a polar carrier liquid. The process comprises the step of: coating the surface of the magnetic particles with an organic ligand having a hydrophilic chain prior to the suspension.

According to a general aspect, there is provided a process for the preparation of a magnetically deformable mirror. The process comprises the steps of: coating magnetic particles with an organic ligand having a hydrophilic chain; adding the ligand coated magnetic particles to a polar carrier liquid to create a ferrofluid including a suspension of the ligand coated magnetic particles in the polar carrier liquid; and coating the ferrofluid with a reflective surface layer.

According to a general aspect, there is provided a process for the preparation of a ferrofluid. The process comprises the steps: coating magnetic particles with an organic ligand including a hydrophilic chain; and introducing the ligand coated magnetic particles in a polar carrier liquid to create a suspension of the ligand coated magnetic particles in the polar carrier liquid.

According to another general aspect, there is provided a suspension of magnetic particles in a polar carrier liquid wherein the magnetic particles are coated with an organic ligand having a hydrophilic chain.

According to still another general aspect, there is provided a ferrofluid comprising a suspension of magnetic particles coated with an organic ligand having a hydrophilic chain in a polar carrier liquid.

According to a further general aspect, there is provided a magnetically deformable mirror comprising a ferrofluid coated with a reflective surface layer wherein the ferrofluid comprises a suspension of magnetic particles in a polar carrier liquid wherein the particles are coated with an organic ligand having a hydrophilic chain.

In an embodiment, the hydrophilic chain of the organic ligand includes an oxyethylene chain. In another embodiment, the organic ligand is a negatively-charged-terminated organic molecule. The negatively-charged-terminated organic molecule can be an carboxylic acid-terminated polyethylene glycol selected from the group consisting of:

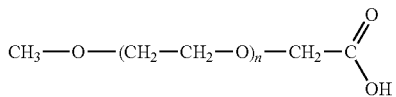

wherein n is an integer from 1 to 50. For instance, the carboxylic acid-terminated polyethylene glycol can be 2-[2-(2-methoxyethoxy)ethoxy]acetic acid.

In an embodiment, the magnetic particles are nanoparticles including iron oxides such as maghemite ($\gamma$-$Fe_2O_3$) and/or magnetite ($Fe_3O_4$).

In an embodiment, the polar carrier liquid is a liquid selected from the group comprising ethylene glycol, polyethylene glycol, glycerol, ionic liquids, and combinations thereof.

In another embodiment, the organic ligand is highly soluble in the polar carrier liquid.

DETAILED DESCRIPTION OF EMBODIMENTS

Figure 1:
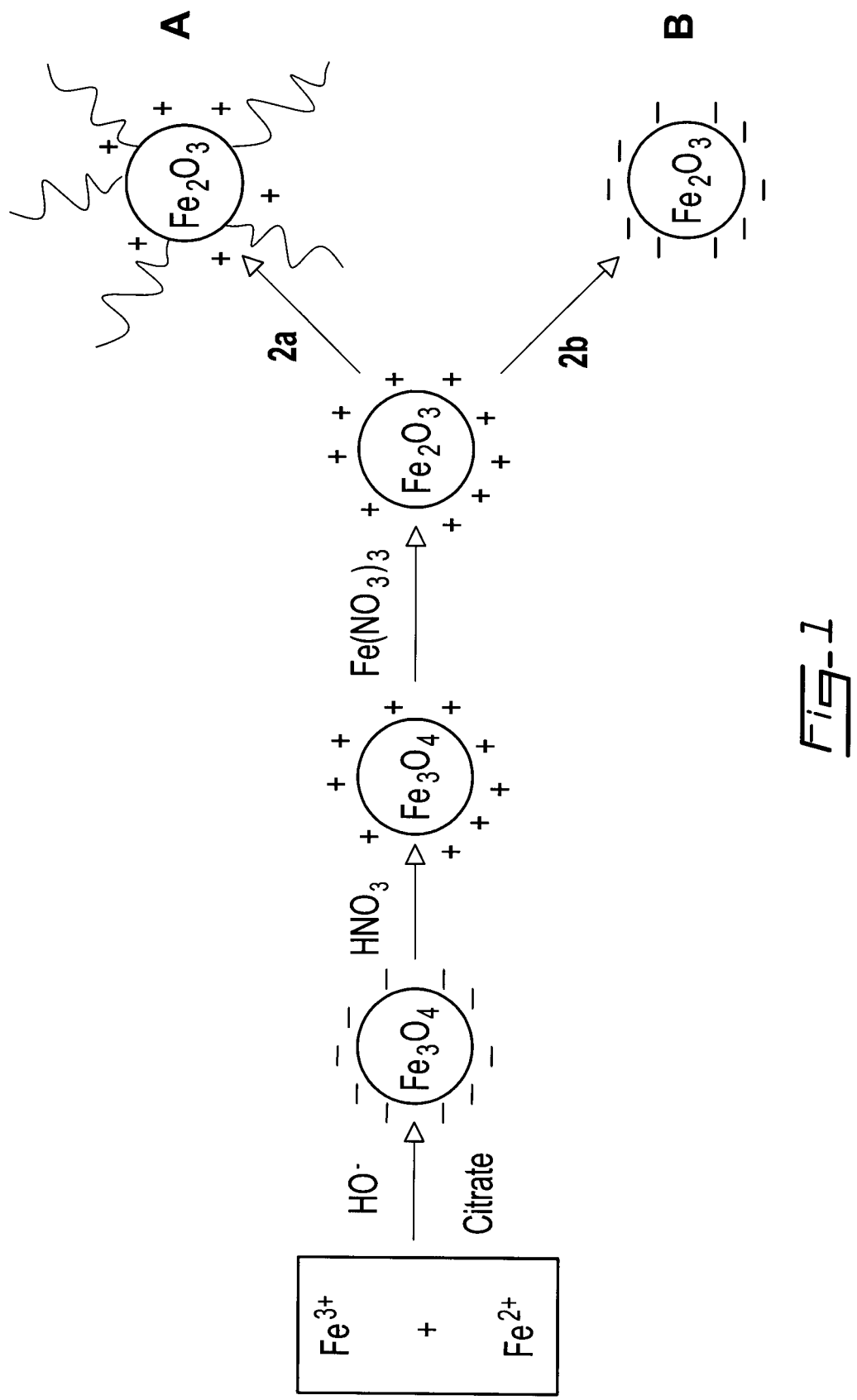
FIG. 1 shows a schematic representation of a synthetic route leading to $\gamma$-$Fe_2O_3$ nanoparticles coated with either (A) 2-[2-(2-methoxyethoxy)ethoxy]acetic acid (MOEEAA) or (B) citrate.

In a process for the preparation of stable suspensions of magnetic particles in a polar carrier liquid, the surface of the magnetic particles is coated with an organic ligand having a hydrophilic chain prior to the suspension.

In a particular embodiment, there is provided a suspension of magnetic particles in a polar carrier liquid wherein the magnetic particles are coated with an organic ligand having a hydrophilic chain.

In another embodiment, there is provided a magnetically deformable mirror, which comprises a ferrofluid coated with a thin reflective layer, such as a reflective film of silver nanoparticles. The ferrofluid includes a suspension of magnetic particles in a polar carrier liquid wherein the magnetic particles are coated with an organic ligand having a hydrophilic chain.

Polar Carrier Liquid

Particularly, the polar carrier liquid is ethylene glycol, polyethylene glycol, glycerol, an ionic liquid or combinations thereof. In an embodiment, the polar carrier liquid has a relatively high surface tension (or polarity). More particularly, the polar carrier liquid is ethylene glycol, polyethylene glycol or glycerol. Most particularly, the polar carrier liquid is ethylene glycol.

Magnetic Particles

In particular, the magnetic particles are nanoparticles. The nanoparticles have a diameter ranging between 2 and 14 nm. The nanoparticles can include iron oxides and, in a particular embodiment, they can include maghemite ($\gamma$-$Fe_2O_3$). It can also include magnetite ($Fe_3O_4$), other magnetic nanoparticles or a combination of various magnetic nanoparticles.

The concentration of magnetic nanoparticles in the polar carrier liquid ranges between 1 and 25 wt %. In an alternative embodiment, it ranges between 5 and 20 wt % and, in another alternative embodiment, it ranges between 10 and 20 wt %. Higher concentrations of magnetic nanoparticles in the polar carrier liquid maximizes deformation resulting from the magnetic field.

In alternative embodiments, the magnetic nanoparticles can include other non iron oxide particles such as and without being limitative cobalt and nickel nanoparticles.

Organic Ligand-Coating

Particularly, the organic ligand has an hydrophilic chain and, more particularly, an oxyethylene chain. In an embodiment, the oxyethylene chain is selected from carboxylic acid-terminated organic molecules. More particularly, the organic molecule is a polar carbon chain, particularly a negatively charged terminated carbon chain such as negatively charged-terminated polyethylene glycol. Most particularly, the par ticles are coated with carboxylic acid-terminated polyethylene glycol of a structure as is shown below:

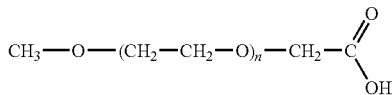

wherein n is an integer ranging from 1 to 50. Particularly, the polymeric portion of the molecule can range from 1 to 30 repeating units (n), more particularly from 1 to 15, most particularly from 2 to 8, even most particularly n=2.

In alternative embodiments, it is appreciated that the organic ligand can include another oxyethylene chain and that the oxyethylene chain can include another attachment group which can be positive, negative or neutral.

In an embodiment, the concentration of organic ligand applied to the magnetic nanoparticles ranges between 1 and 15 wt % and, in an alternative embodiment, it ranges between 3 and 10 wt %.

Particular Embodiment

In a particular embodiment, there is provided a stable suspension of magnetic nanoparticles in ethylene glycol where the magnetic particles are coated with 2-[2-(2-methoxyethoxy)ethoxy]acetic acid (MOEEAA; where n is 2). This organic molecule is highly soluble in polar liquids, i.e. the organic molecule has a relatively high chemical affinity for the polar liquid. This molecule is composed of a carboxylic acid group, which adsorbs to the particle surface, and a methoxy terminated chain of two ethoxy groups which ensures favourable interaction with the polar carrier liquid.

The improved polar ferrofluid reported herein shows excellent magnetic stability and does not precipitate.

These new MOEEAA-coated magnetic particles allow for the deposition of a reflective layer (MELLF) on the air-ferrofluid interface.

Reflective Layer

The reflective layer can be made of colloidal particles, such as nanoparticles, which can be metallic or non-metallic. In an embodiment, the nanoparticles are silver particles, although any other suitable reflecting metallic particles from the periodic table can be used, such as gold, aluminum, or the like. Nanoparticles can be obtained by chemical means such as reduction, or non chemical means such as laser treatment or mechanical ablation from a solid. The reflecting particles can be coated with a surfactant, which are well-known to those skilled in the art, to stabilize the reflecting layer. Coated fluids usually result in high-reflectivity mirrors, especially when reflecting metallic nanoparticles are used.

In another embodiment, the ferrofluid can be covered with a flexible membrane that follows the deformation of the ferrofluid, and the latter may be made with numerous techniques. For example, the membrane may be made of Mylar™, Melinex™, polyimide, polyamide, gold coated nickel, silicon nitride or any coated or uncoated polymer film. If the membrane is uncoated, it forms the mirror surface. If the membrane is in direct contact with the ferrofluid, the coated or uncoated membrane forms the mirror surface and follows the deformation of the liquid substrate.

In another embodiment, the flexible membrane can be coated with a reflective layer using several techniques. For this coating purpose, one can use chemical deposition in aqueous or non-aqueous media, electrodeposition, vaporization, coating by sputtering from hot electrically heated elements, or any other method known by one skilled in the art. In such a membrane arrangement, the ferrofluid supports the surface allowing a thinner membrane than is possible with mirrors employing membranes over an air gap. The ferrofluid provides a means to deform the membrane that is free of print through effects.

In another embodiment, a transparent rigid membrane can be disposed above and not directly in contact with the liquid reflective mirror. This transparent rigid membrane protects the optical surface from dust, evaporation or other contamination.

EXAMPLES

Example 1

Preparation of the Magnetic Particles

Particles were prepared by a precipitation technique and, more particularly, by coprecipitation involving the addition of an alkaline solution to an acidic aqueous mixture of ferrous and ferric salt. The procedure is similar, but not identical to, a previously reported method by Tourinho et al. (F. A. Tourinho, R. Franck, R. Massart, "Aqueous ferrofluids based on manganese and cobalt ferrites" J. Mater. Sci 25 (1990) 3249-3254).

Separate solutions of $FeCl_3$ and $FeCl_2$ were prepared in aqueous hydrochloric acid (0.09M). Concentrations were selected to maintain a molar ratio [Fe(II)/Fe(III)]=0.5. The two solutions were heated to 70° C. and combined for a total volume of 200 mL ($[Fe]_{total}$=0.15M), just prior to the next step.

20 mL of a solution containing both NaOH (10M) and trisodium citrate dihydrate (0.085M) (6% molar ratio of $[Fe]_{total}$) was added quickly to the iron solution with both solutions being previously heated to 70° C. The resulting solution was maintained at 70° C. and under vigorous stirring for 30 minutes. The resulting magnetite particles were collected with a strong magnetic field using a permanent magnet.

The $Fe_3O_4$ particles were washed three times by stirring the precipitate with 200 mL of nanopure water. Each nanopure water washing was followed by a washing with 200 mL of nitric acid (1 M). The particles were decanted between each step with a strong magnetic field using a permanent magnet.

The particles were treated with nitric acid (2M) for 3 hours in order to introduce a positive charge on the surface.

The particles were collected with a magnet and re-dispersed in 100 mL of water.

100 mL of an aqueous iron(III) nitrate nonahydrate solution (0.5M) (or ferric nitrate) was added to the particle suspension and heated at 100° C. under vigorous stirring. Stirring was continued for 30 minutes to oxidize at least a portion of magnetite ($Fe_3O_4$) to maghemite ($\gamma$-$Fe_2O_3$).

The particles were decanted with a strong magnetic field using a permanent magnet and washed twice with acetone (100 mL) before being dispersed in 100 mL of nanopure water.

Example 2

Addition of Dispersing/Stabilizing Agents

Two different methods of stabilisation were employed.

2a. Stabilisation with MOEEAA:

The aqueous suspension of particles (prepared as described in example 1) was centrifuged at 3500 rpm to eliminate aggregates.

3.5 ml of 2-[2-(2-Methoxyethoxy)ethoxy]acetic acid (MOEEAA) was added to the particles dispersed in nanopure water previously heated at 90° C. and the mixture was kept at this temperature and under vigorous stirring for 30 minutes. To isolate ligand-coated particles, an equivalent volume of acetone was added and particles were centrifuged at 15000 rpm for 90 minutes.

2b. Stabilisation with citrate (E. Dubois, V. Cabuil, F. Boué and R. Perzynski, "Structural analogy between aqueous and oily magnetic fluids," J. Chem. Phys., Vol. 111, No. 15, (1999)):

The aqueous suspension of particles (100 mL) was heated to 90° C. and 2 grams of trisodium citrate were added under vigorous stirring. The particles were washed twice with acetone, being collected during decantation by a magnetic field.

The particles were re-dispersed in water and aggregates were eliminated by centrifugation at 2000 rotations/min for 15 minutes.

The various synthetic steps are summarized in FIG. 1 for both MOEEAA and citrate coatings. Positively charged particles obtained after treatment with $Fe(NO_3)_3$, without stabilizing coating, can be dispersed in ethylene glycol, but the suspension is not stable in the presence of a magnetic field. Both negatively charged citrate-coated particles (A) and positively charged particles functionalized with MOEEAA (B) form stable suspensions in ethylene glycol, but, as shown below, only the later are compatible with the MELLF. Positively charged particles functionalized with MOEEAA form stable suspensions also in glycerol.

Example 3

Preparation of the Ferrofluid

The stabilized particles, obtained either through procedure 2a or procedure 2b were dispersed in ethylene glycol to obtain a weight percentage of particles of 19%.

Example 4

Preparation of the Silver Particles

The preparation of the silver particles was as described in U.S. Pat. No. 6,951,398.

Example 5

Preparation of Liquid Mirrors

Magnetically deformable mirrors were prepared by coating the ferrofluid with a surface film of silver nanoparticles. Typical mirrors were prepared with 6 mL of ferrofluid, placed in an aluminum dish having a diameter of 7 cm. The metallic silver particles, prepared and concentrated as described (Gingras, J.; Déry, J. P.; Yockell-Lelièvre, H.; Borra, E. F.; Ritcey, A. M. *Colloids Surf., A* 2006, 279, 79.) were sprayed onto the ferrofluid surface with a commercial paint spray gun connected to a nitrogen cylinder at a pressure of 275 kPa.

Example 6

Characterization of Iron Oxide Nanoparticles Particles

X-ray diffraction patterns of dry magnetic particles were obtained with a Siemens XRD system with Cu K radiation.

Figure 2:
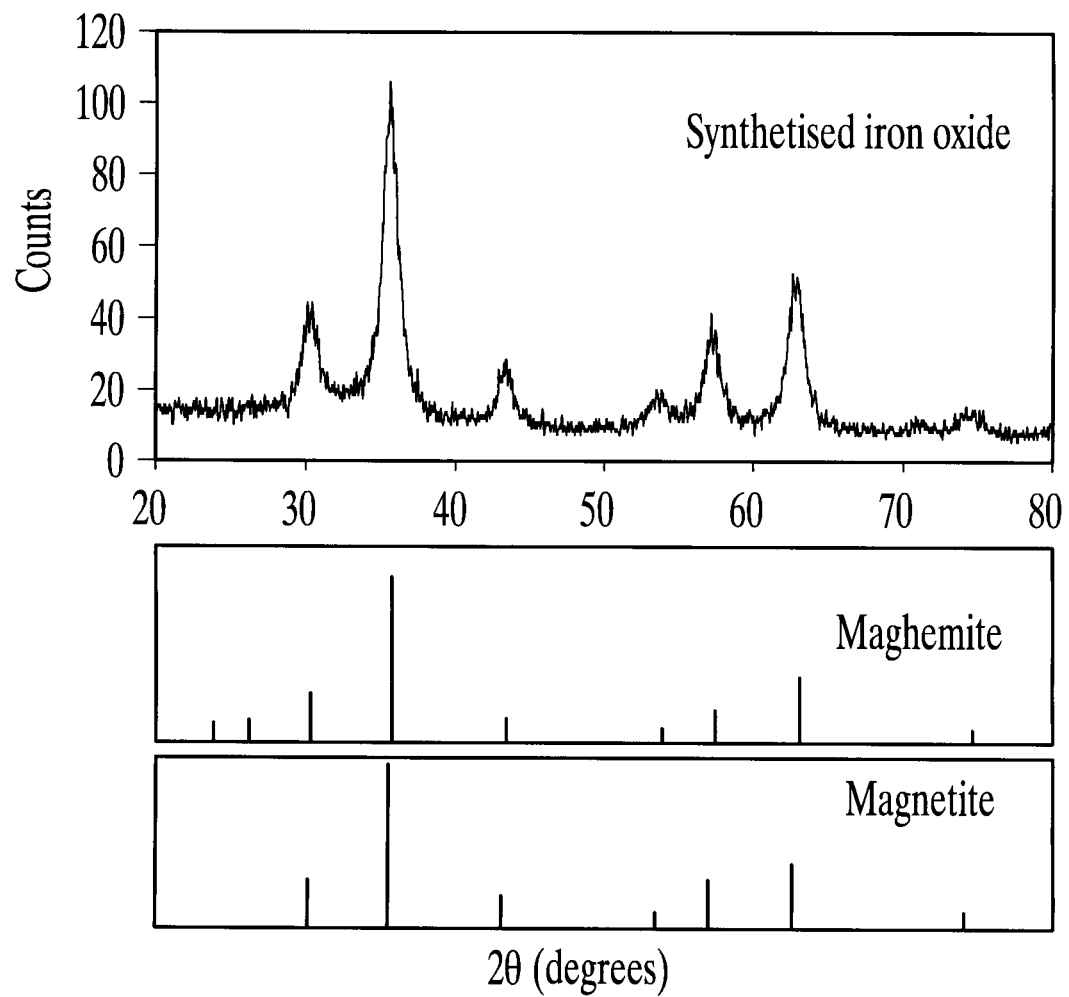
FIG. 2 is a x-ray diffraction pattern of synthesized iron oxide nanoparticles compared to literature data of maghemite ($\gamma$-$Fe_2O_3$) and magnetite ($Fe_3O_4$)

FIG. 2 shows the x-ray diffraction pattern recorded for the iron oxide nanoparticles isolated before functionalization with MOEEAA or citrate. Although the co-precipitation method employed to prepare the particles has been previously reported to yield maghemite ($\gamma$-$Fe_2O_3$), (Bee, A.; Massart, R.; Neveu, S. *J. Magn. Magn. Mater.* 1995, 149, 6) the possibility of obtaining mixtures containing residual magnetite ($Fe_3O_4$) has also been noted (Maity, D.; Agrawal, D. C. *J. Magn. Magn. Mater.* 2007, 308, 46). Known x-ray diffraction patterns (Cornell, R. M.; Schertmann, U. *The Iron Oxides: Structure, Properties, Reactions, Occurence and Uses*, VCH Publishers, Weinheim, 2003) for $\gamma$-$Fe_2O_3$ and $Fe_3O_4$ are thus also shown in FIG. 2 for comparison. The position and relative intensities of the diffraction peaks reported in Table 1 indeed indicate that it is very difficult to distinguish between the two forms by this method. Given the oxidizing conditions used in particle preparation, it can be assumed that maghemite ($\gamma$-$Fe_2O_3$) is primarily obtained, but the possibility of residual magnetite remaining in the core of the particles cannot be excluded.

TABLE 1

X-ray diffraction data literature for maghemite ($\gamma$-$Fe_2O_3$) and magnetite ($Fe_3O_4$) compared to experimental data obtained from prepared iron oxide magnetic nanoparticles (for $2\theta = 20°$-$80°$).

| Literature data | | | | Experimental data | |
|---|---|---|---|---|---|
| $\gamma$-$Fe_2O_3$ | | $Fe_3O_4$ | | | |
| $2\theta°$ | I | $2\theta°$ | I | $2\theta°$ | I |
| 23.86 | 12 | — | — | — | — |
| 26.21 | 14 | — | — | — | — |
| 30.29 | 30 | 30.12 | 30 | 30.24 | 34 |
| 35.72 | 100 | 35.45 | 100 | 35.60 | 100 |
| 43.38 | 15 | 43.06 | 20 | 43.39 | 22 |
| 53.90 | 9 | 53.44 | 10 | 53.52 | 13 |
| 57.45 | 20 | 56.99 | 30 | 57.16 | 35 |
| 63.07 | 40 | 62.57 | 40 | 62.80 | 47 |
| 74.61 | 8 | 74.02 | 10 | 74.16 | 10 |

Transmission electron microscopy images of iron oxide nanoparticles were obtained with a JOEL JEM-1230 microscope operated at an acceleration voltage of 80 kV. Samples were prepared by evaporation of a drop of the particle suspension on a Formvar coated nickel grid.

Figure 3:
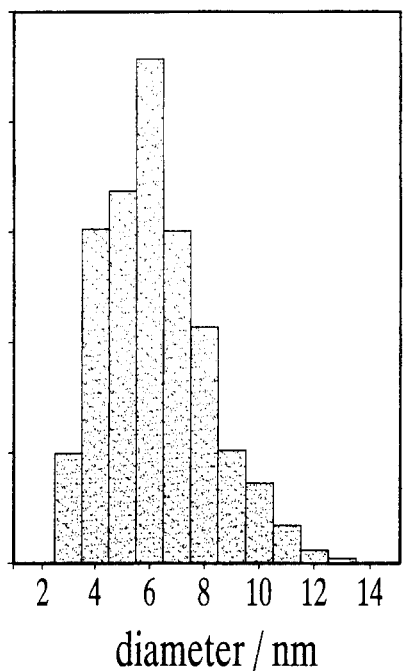
FIG. 3 is a TEM micrograph of uncoated iron oxide nanoparticles dried from aqueous suspension on a Formvar coated nickel grid wherein the particle size distribution is shown in the inset.
Figure 3:
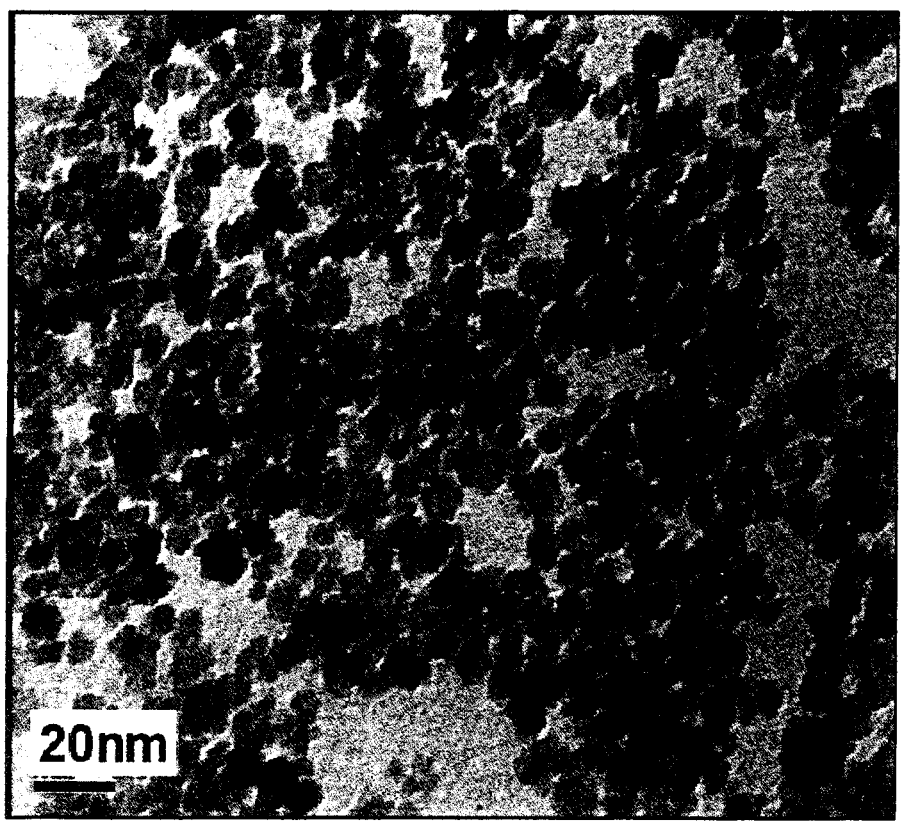

A typical transmission electron micrograph of the iron oxide nanoparticles particles is shown in FIG. 3. The particles were found to be roughly spherical with a mean diameter of about 6 nm. The particle size distribution, as evaluated from manual measurements of about 1000 particles, is also shown in FIG. 3 and agrees well with that typically obtained by the co-precipitation method of particle preparation (Tourinho, F. A.; Franck, R.; Massart, R. *J. Mater. Sci.* 1990, 25, 3249). Similar images were obtained for the particles functionalized with either citrate or MOEEAA.

Example 7

Characterization of Surface Functionalized Particles

Particles functionalized with either MOEEAA or citrate were characterized by infrared spectroscopy and thermogravimetry. Infrared measurements provide information about the chemical nature of the coating layer, whereas thermogravimetry allows for the quantitative evaluation of the grafting density.

Infrared Spectroscopy

Infrared spectra of the dried particles were recorded using a Nicolet Magna IR 850 spectrometer equipped with a Golden Gate single reflection diamond ATR series MkII.

Figure 4:
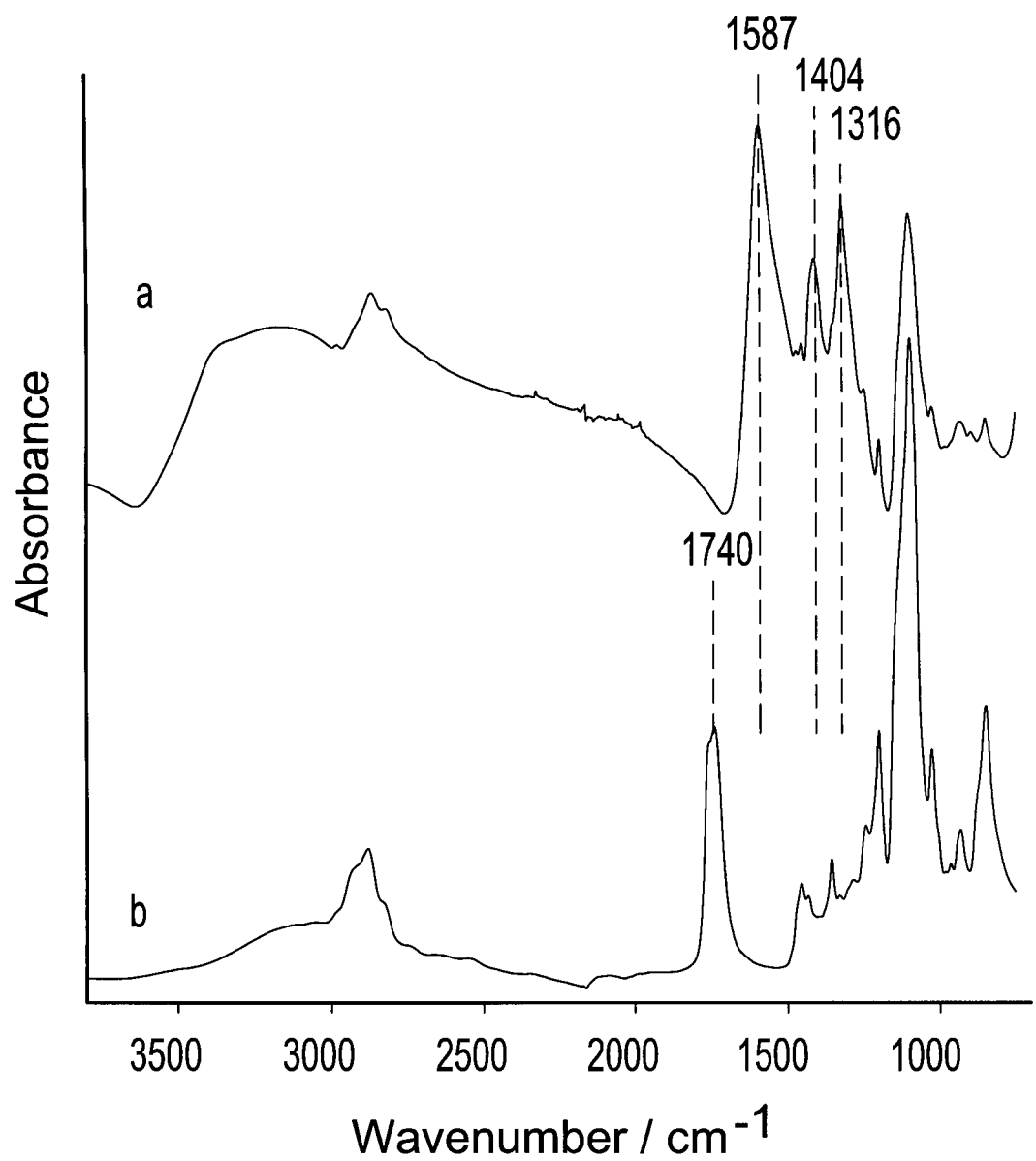
FIG. 4 shows a IR spectra of (a) dried iron oxide nanoparticles coated with MOEEAA and (b) pure MOEEAA.

The infrared spectra of pure MOEEAA and of dried MOEEAA coated particles are shown in FIG. 4. The absorption frequencies corresponding to the principal bands are reported in Table 2 along with peak assignments. In the case of pure MOEEAA, the most intense absorption bands are found at 1098 cm$^{-1}$, 1740 cm$^{-1}$ and 2881 cm$^{-1}$, arising from vibrations characteristic of the constituent ether, carboxylic acid carbonyl and methylene groups, respectively. The spectrum of the coated particles exhibits bands corresponding to the ether and methylene stretching frequencies at 1093 cm$^{-1}$ and 2866 cm$^{-1}$, thus confirming the presence of MOEEAA. Bands arising from the carboxylate group are also evident, appearing at positions that differ significantly from that observed for the carbonyl of the free molecule. In fact, three relatively intense bands are observed at 1587 cm$^{-1}$, 1404 cm$^{-1}$ and 1316 cm$^{-1}$. The strong band at 1587 cm$^{-1}$ can be attributed to the carboxylate asymmetric stretch indicating that the free acid is deprotonated upon binding to the surface of the particle. The two bands at 1404 cm$^{-1}$ and 1316 cm$^{-1}$ can both be assigned to the symmetric stretching vibration of the carboxylate group, suggesting the presence of two different modes of surface coordination. In a detailed infrared study of the binding of a number of carboxylic acids to oxidized aluminium, Allara et al. (Allara, D. L.; Nuzzo, R. G. *Langmuir* 1985, 1, 52) also reported two distinct symmetric carboxylate stretching frequencies (1475 cm$^{-1}$ and 1417 cm$^{-1}$). Although these authors attributed the observation of two bands to the presence of two types of adsorbate-substrate bonding, they were unable to provide specific structural assignments. Extensive studies of metal complexes of carboxylic acids indicate that the frequency difference between the asymmetric and symmetric stretching vibrations can be correlated with the bonding mode (Nakamoto, K. *Infrared and Raman spectra of inorganic and coordination compounds*; John Wiley and Sons: New York, 1997). Bidentate complexes, in which both carboxylate oxygen atoms are bound to a single metal ion, exhibit frequency differences between the two vibrations of 40-70 cm$^{-1}$. Bridging complexes in which the two oxygen atoms are bound to neighbouring metal ions show larger frequency differences, of the order of 140-170 cm$^{-1}$. The largest frequency differences, in some cases exceeding 300 cm$^{-1}$, are observed for unidentate complexes in which only one oxygen atom is bound to the metal. The IR spectrum of the MOEEAA functionalized magnetic particles exhibit two bands assigned to the symmetric carboxylate stretch, at frequencies corresponding to [$u_a$(COO$^-$)–$u_s$(COO$^-$)] equal to 183 cm$^{-1}$ and 271 cm$^{-1}$, respectively. These frequency differences indicate that the ligand is bound to the surface both through bridging and unidentate structures.

TABLE 2

Infrared band position and vibrational assignments for 2-[2-(2-methoxyethoxy)ethoxy]acetic acid (MOEEAA) and dried iron oxide nanoparticles coated with MOEEAA.

| Band frequency/cm$^{-1}$ | | |
|---|---|---|
| MOEEAA | MOEEAA coated γ-Fe$_2$O$_3$ particles | Band assignment |
| 2881 | 2866 | u(C—H) for —CH$_2$ |
| 1740 | — | u(C=O) for free —COOH |
| — | 1587 | u(COO$^-$) asym for adsorbed COO$^-$ |
| — | 1404 | u(COO$^-$) sym (bridging coordination)* |
| — | 1316 | u(COO$^-$) sym (unidentate coordination)* |
| 1200 | 1190 | u(C—O—C) asym |
| 1098 | 1093 | u(C—O—C) sym |

*Nakamoto, K. Infrared and Raman spectra of inorganic and coordination compounds; John Wiley and Sons: New York, 1997.

Willis et al. (Willis, A. L.; Turro, N. J.; O'Brien, S. *Chem. Mater.* 2005, 17, 5970) recently reported that the infrared spectrum of oleic acid bound to γ-Fe$_2$O$_3$, exhibits asymmetric and symmetric carboxylate stretching bands at 1527 cm$^{-1}$ and 1430 cm$^{-1}$, respectively. While the identification of a single symmetric stretching frequency implies a single bonding mode in this case, Willis et al. note that the bands are relatively large and attribute this to the presence of a mixture of compounds on the surface.

It is relevant to note that the symmetric carboxylate stretching frequencies observed for MOEEAA bound to iron oxide nanoparticles appear at significantly lower frequencies that those found for carboxylic acids on Al$_2$O$_3$ (Allara, D. L.; Nuzzo, R. G. *Langmuir* 1985, 1, 52). The stretching frequencies of coordinated carboxylates are known to vary significantly from one metal ion to another (Nakamoto, K.; McCarthy, P. J. *Spectroscopy and Strucutre of Metal Chelate Compounds*; John Wiley and Sons: New York, 1965). IR spectra of a series of n-alkanoic acids self-assembled on metal oxide surfaces indicate that both the carboxylate symmetric and asymmetric stretching frequencies shift to lower frequencies as stability of the ligand to surface bond increases. The relatively low frequencies observed for the MOEEAA functionalized particles thus imply relatively strong bonding.

Figure 5:
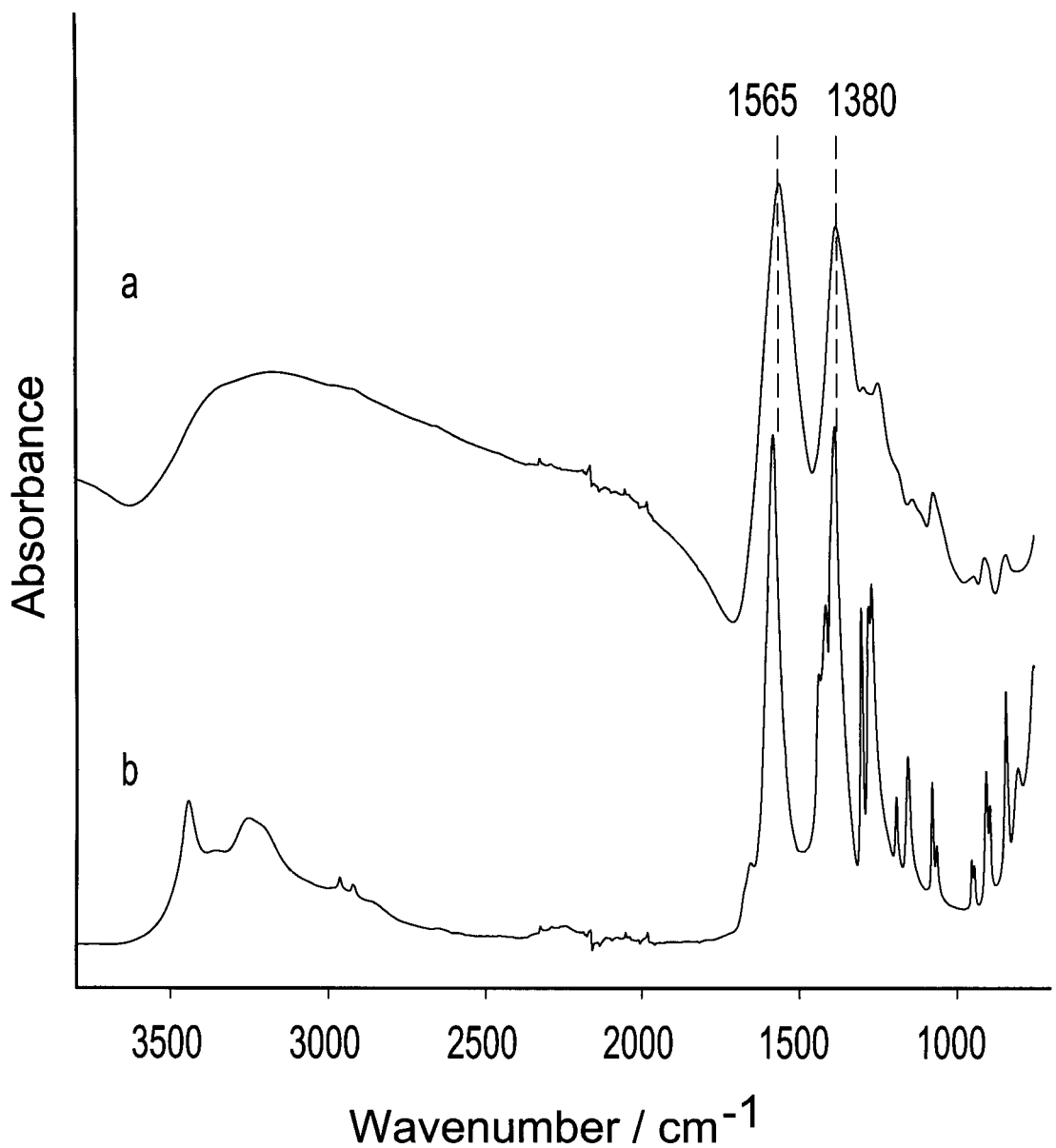
FIG. 5 shows a IR spectra of (a) dried iron oxide nanoparticles coated with trisodium citrate and (b) pure trisodium citrate.

FIG. 5 shows the infrared spectrum of dried iron oxide nanoparticles coated with citrate. The spectrum of trisodium citrate is also shown for comparison. Both spectra exhibit bands characteristic of the asymmetric and symmetric stretching vibrations of the carboxylate moiety. In this case, the spectral changes that accompany surface bonding are less significant than those observed for MOEEAA coated particles. This is because the precursor ligand was introduced as a carboxylate salt rather than in the acid form. Furthermore, each ligand molecule contained three carboxylate groups and not all were involved in direct interactions with the surface. Nevertheless, small shifts to lower frequencies are observed for both asymmetric (1574 cm$^{-1}$ to 1565 cm$^{-1}$) and symmetric (1385 cm$^{-1}$ to 1380 cm$^{-1}$) stretching bands upon the adsorption of citrate to the particle surface.

Thermogravimetric Analyses

Thermogravimetric analyses were performed with a Mettler Toledo instrument (model TGA/SDTA851$^e$) using an aluminum oxide crucible. Samples were heated under a simultaneous flow of air and nitrogen at a rate of 50 mL/min for each gas. Samples were heated from 25° C. to 900° C. at the heating rate of 10° C./min.

Figure 6:
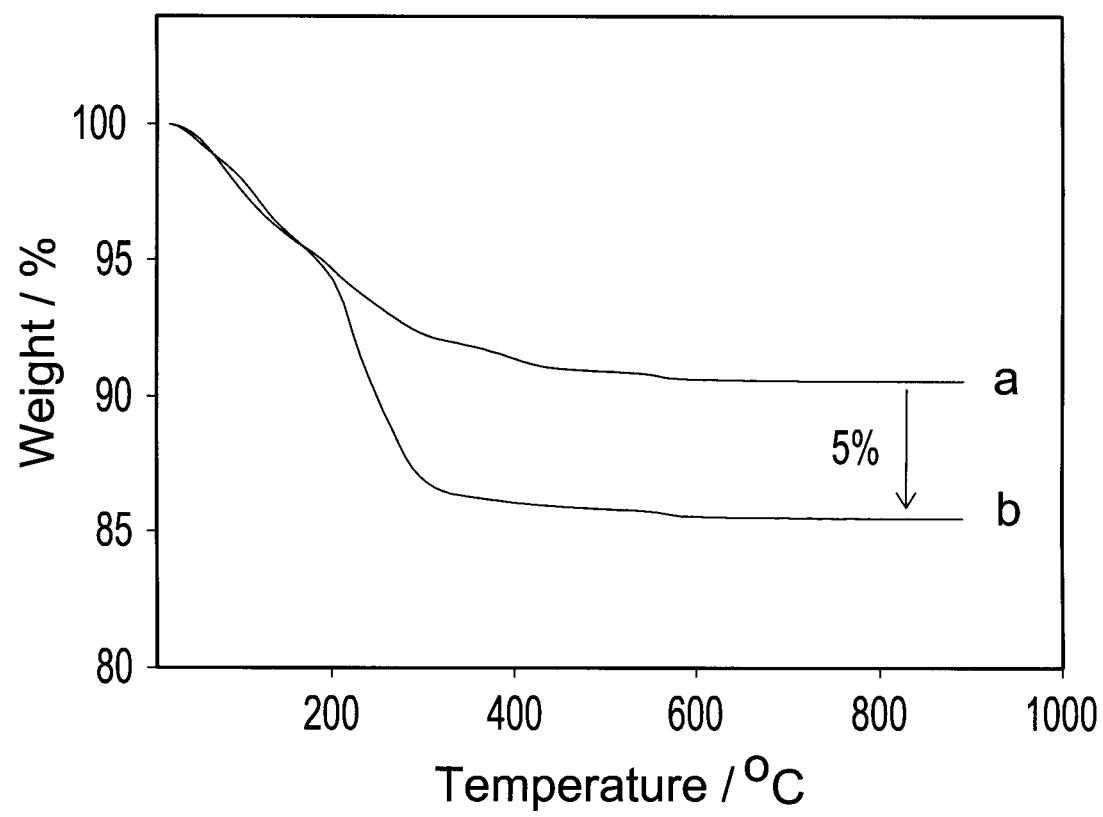
FIG. 6 is a graph showing thermograms of (a) dried uncoated iron oxide nanoparticles and (b) dried iron oxide nanoparticles coated with MOEEAA.

The weight loss observed upon iron oxide nanoparticles coated with MOEEAA is plotted in FIG. 6. The thermogram obtained for the uncoated particles is also provided for comparison. Upon heating between room temperature and 900° C., the uncoated particles show a weight loss of 9.4% that can be attributed to water desorption from the surface. Over the same temperature range, the coated particles exhibit a greater weight loss due to the decomposition of the organic ligand. If it is assumed that the coated and uncoated particles have the same water content, the weight percent of MOEEAA bound to the functionalized particles can be evaluated from the difference in weight loss between the two samples. In the present case, this difference is 5%. This result can be combined with the average particle size determined by TEM to estimate the grafting density of the MOEEAA chains on the particle surface as 1.2 molecule/nm$^2$. This relatively low grafting density provides a reasonable justification for the assumption that the water content of the particles is not significantly altered by the presence of the MOEEAA chains.

Figure 7:
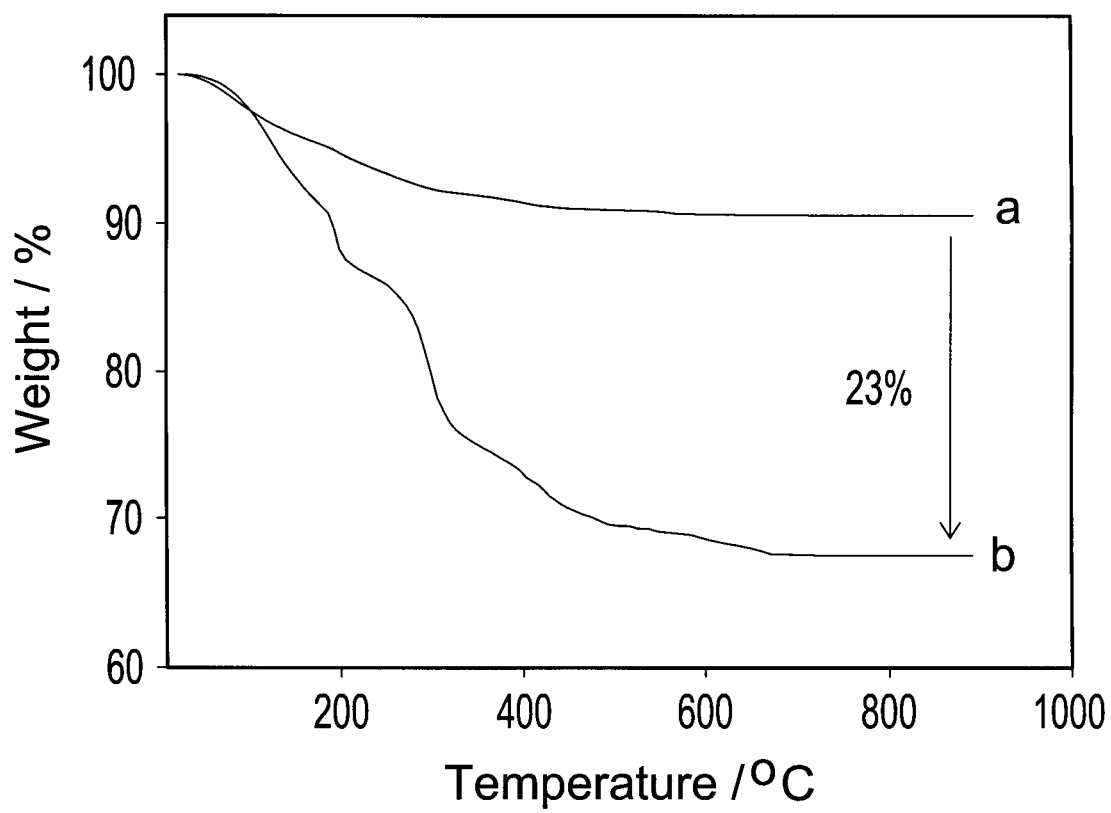
FIG. 7 is a graph showing thermograms of (a) dried uncoated iron oxide nanoparticles and (b) dried iron oxide nanoparticles coated with trisodium citrate.

FIG. 7 shows the thermograms obtained for the citrate coated particles. The functionalized particles exhibit a weight loss that exceeds that observed for the uncoated particles by 23%. If this difference is entirely attributed to the mass of citrate present, a grafting density of 6.4 molecules/nm$^2$ is obtained. It is, however, important to note that in the case of citrate adsorption, the assumption that the water content is unaltered by the presence of the ligand is probably not justified and the grafting density obtained in this way can only be considered as an estimate.

Example 8

Characterization of Dispersed Particles

Zeta potential and particle size were determined from dynamic light scattering measurements carried out with a Malvern Zetasizer nano series Nano-ZS. Particles were dispersed in ethylene glycol at a weight percentage of 0.6%. The viscosity of the pure solvent was employed in the particle size calculations.

Dynamic light scattering measurements were performed on ethylene glycol suspensions of uncoated iron oxide nanoparticles and of iron oxide nanoparticles coated with either citrate or MOEEAA. The resulting particle size distributions are plotted in FIG. 8 (curves a, b and c). The three samples exhibit near identical particle size distributions centered near diameters of 100 nm. This average particle size is much greater than that evaluated from TEM images. Dynamic light scattering typically yields particle sizes that exceed those obtained by microscopy. This is in part because dynamic light scattering measures the hydrodynamic radius which is larger than the radius of a dry particle. In addition, the dynamic light scattering results are expressed as the intensity weighted z-average which is biased toward larger particles since the scattering intensity is proportional to the square of particle molecular weight. However, neither of these factors is sufficient to explain the large difference in particle size obtained here. Similar differences have been reported for maghemite particles dispersed in both water and dodecane and attributed to particle aggregation. The aggregation of magnetic particles in the absence of a magnetic field were theoretically investigated by the Monte Carlo technique. In the case of particles having a diameter of 10 nm, the attractive magnetostatic interaction energy between particles can be evaluated as being on the order of 10 kT. This attraction is sufficient to cause the formation of dynamic particle clusters containing on the order of 5-15 particles. The presence of such clusters in the particle suspensions would clearly explain why the hydrodynamic diameters obtained by dynamic light scattering are an order of magnitude larger than the diameters observed by TEM.

Dynamic light scattering was also employed to evaluate the zeta potential of the various particles. The results are summarized in Table 3. The uncoated particles were found to be positively charged, as expected from their prior treatment with nitric acid. The introduction of MOEEAA did not significantly alter the particle surface charge. This observation is consistent with the relatively low grafting density determined by thermogravimetry measurements.

TABLE 3

Zeta potential of iron oxide nanoparticles with differing surface coatings, dispersed in ethylene glycol.

| Nature of the particles | Zeta potential/mV |
|---|---|
| Uncoated | +45 |
| Coated with citrate | −50 |
| Coated with MOEEAA | +44 |
| Coated with MOEEAA - hydroxide treated | 0 |

When dispersed in water, particles either coated with MOEEAA or not lead both to acidic ferrofluids at pH 4. The iron oxide nanoparticles coated with MOEEAA are unstable in aqueous solution between pH 5 to pH 10 as described in Hasmonay et al. (Hasmonay, E.; Bee, A.; Bacri, J.-C.; Perzynski, R. *J. Phys. Chem. B* 1999, 103, 6421) for similar iron oxide nanoparticles.

Figure 8:
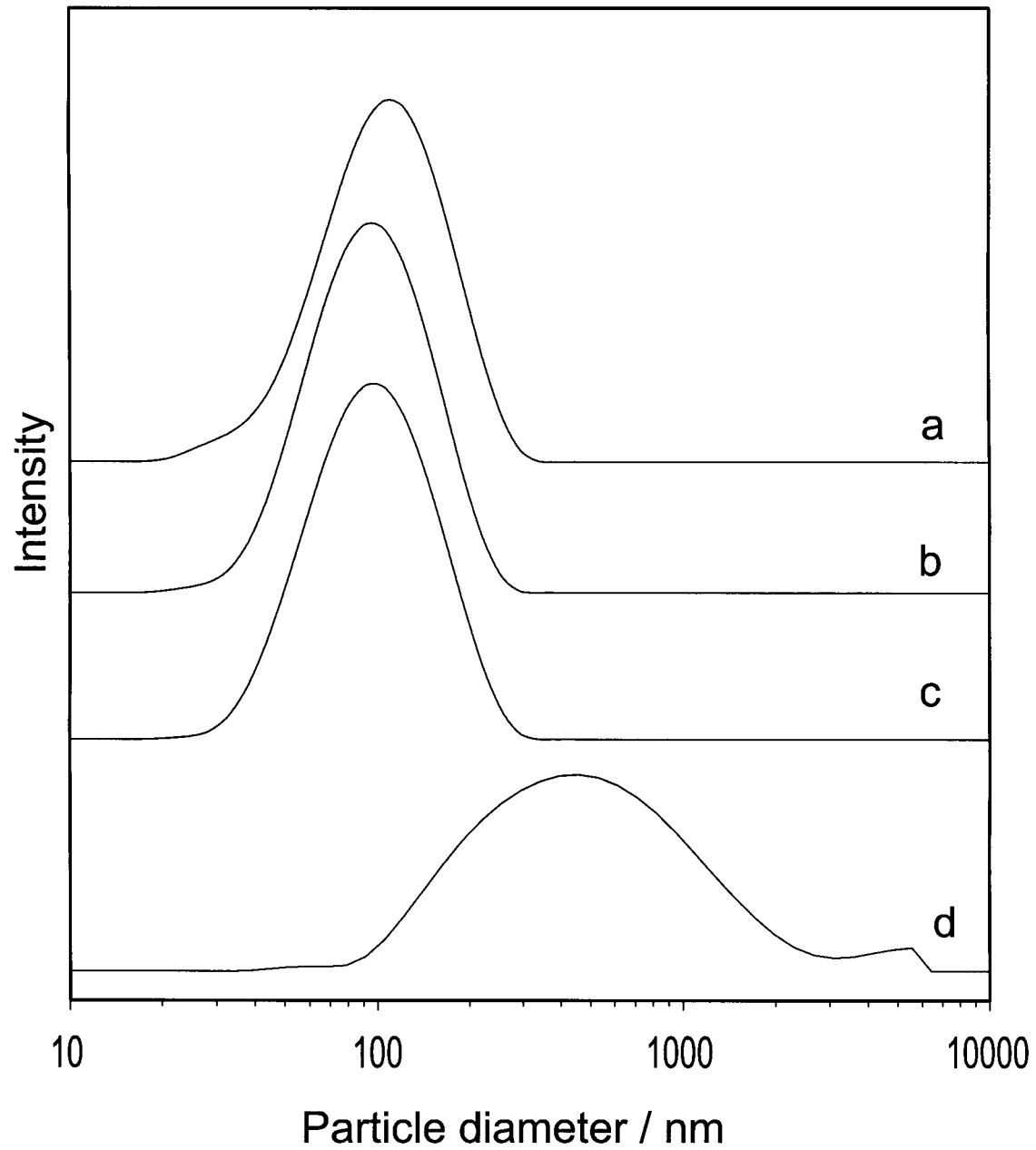
FIG. 8 shows intensity weighted z-average particle size distributions obtained from dynamic light scattering measurements on ethylene glycol suspension of (a) uncoated iron oxide nanoparticles, (b) iron oxide nanoparticles coated with citrate, (c) iron oxide nanoparticles coated with MOEEAA and (d) iron oxide nanoparticles coated with MOEEAA and subsequently treated with sodium hydroxide.

As discussed in further detail below, the presence of surface grafted MOEEAA has an important effect on the stability of the ferrofluid prepared in ethylene glycol. In order to determine whether the steric repulsion between particles generated by the MOEEAA chains is sufficient to prevent particle agglomeration, the positive particles were neutralized by the addition of sodium hydroxide ([NaOH]=0.06 M). As illustrated in FIG. 8 (curve d), this treatment has an important effect on the particle size distribution, which is shifted to larger hydrodynamic diameters and significantly broadened, suggesting increased aggregation. This observation indicates that the particle suspension is primarily stabilized by electrostatic repulsions and the grafted MOEEAA chains alone do not provide sufficient steric stabilization.

Example 9

Characterization of Ferrofluids and Magnetically Deformable Mirrors

Ferrofluids were prepared by the dispersion of the various maghemite particles in ethylene glycol at a particle weight percent of 19%. The relative performance of the ferrofluids was evaluated from the amplitude of the surface deformation resulting from the application of a static magnetic field. For instance, the magnetic field can be created by means of permanent magnets, electromagnets, or a combination thereof. The deformation h can be approximated as $$h = \frac{\mu_0(\mu_r - 1)}{2\rho g}(\mu_r H_n^2 + H_t^2) \quad (1)$$

where $\rho$ is the density of the ferrofluid, $H_n$ and $H_t$ are the normal and tangential components of the magnetic field inside the ferrofluid, $\mu_r$ is the relative magnetic permeability and $\mu_o$ the permeability of free space. This equation indicates that for a fixed magnetic field strength, the observed deformation is a measure of $\mu_r$, which is, in turn, related to the magnetic susceptibility $\chi$ by $$\mu_r = \chi + 1 \quad (2)$$

Ferrofluids prepared from the uncoated particles showed unstable surface deformations when a magnetic field is applied. Ferrofluids prepared from particles coated with either MOEEAA or citrate, on the other hand, were stable and exhibited surface deformations that depend on the magnetic field strength.

Performance of the ferrofluid was evaluated by placing a sample on a single electromagnetic coil. Magnetic fields of the order of a few Gauss were generated by the application of a potential to the coil. As shown in Table 4, the MOEEAA-stabilized particles (A) demonstrated a similar performance—similar deformations at the same magnetic field as the citrate-stabilized particles (B).

For a given magnetic field strength, larger deformations were found for the MOEEAA coated particles than for those stabilized with citrate. This may in part be a result of the lower grafting density of MOEEAA which results in a greater concentration of magnetic material in the ferrofluid suspension at a given weight fraction of particles.

TABLE 4

Peak-to-valley amplitude of deformation as a function of applied voltage for ethylene glycol based ferrofluids prepared from iron oxide nanoparticles coated with either MOEEAA or citrate.

| Actuator potential/V | Amplitude of deformation/μm | |
| --- | --- | --- |
| | MOEEAA | Citrate |
| 5 | 3.5 | 2.6 |
| 10 | 14 | 9.7 |

Figure 9A:
FIG. 9 includes FIGS. 9a, 9b, and 9c and are photographs showing magnetically deformable liquid mirrors prepared from silver nanoparticles spread on the surface of ethylene glycol based ferrofluids containing respectively (a) iron oxide nanoparticles coated with citrate, after five to seven days, (b) iron oxide nanoparticles coated with MOEEAA, and (c) the same liquid mirror as pictured in FIG. 9(b), after 70 days.

The clear advantage of the MOEEAA stabilized ferrofluid is demonstrated during coating with a thin reflective film of silver nanoparticles to fabricate magnetically deformable mirrors (Gingras, J.; Déry, J. P.; Yockell-Lelièvre, H.; Borra, E. F.; Ritcey, A. M. *Colloids Surf., A* 2006, 279, 79). The photographs of mirrors prepared in this way are provided in FIG. 9 for ferrofluids containing MOEEAA and citrate stabilized magnetic particles. The surface film of silver nanoparticles is clearly disrupted by the citrate stabilized suspension after five to seven days as shown in FIG. 9a. More particularly, cracks having width of few millimetres appeared on the reflective surface about one week after deposition. Deposition of MELLF on a ferrofluid with citrate-stabilized particles showed instabilities.

Figure 9B:
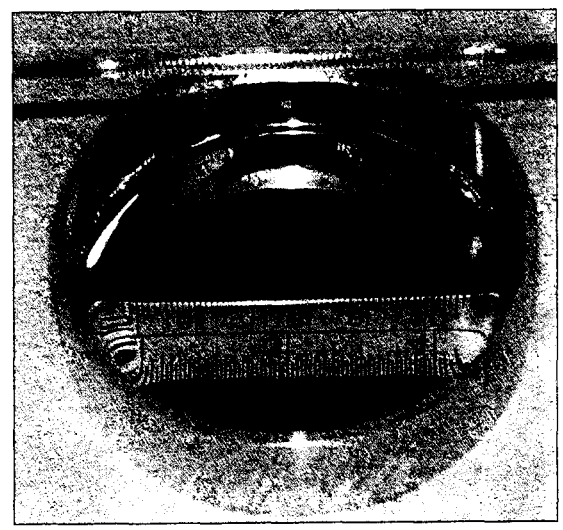
Figure 9C:
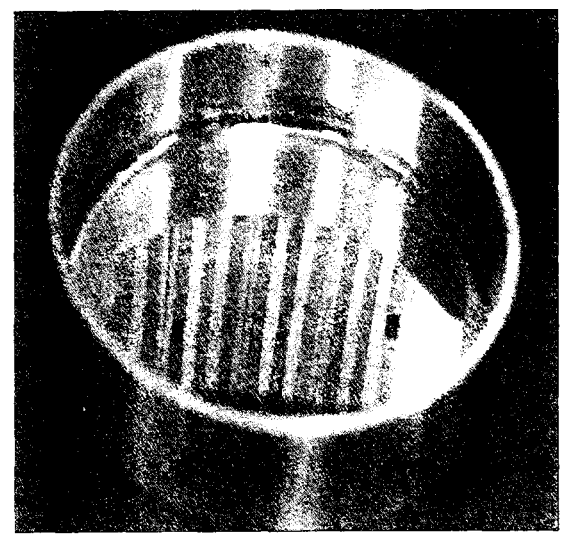

Referring now to FIGS. 9b and 9c, there is shown that the liquid mirror spread on the MOEEAA stabilized ferrofluid, on the other hand, exhibits excellent reflectivity properties, comparable to those previously reported for silver nanoparticles spread on water and the MELLF optical quality remains stable for up to 70 days after the deposition (Gingras, J.; Déry, J. P.; Yockell-Lelièvre, H.; Borra, E. F.; Ritcey, A. M. *Colloids Surf., A* 2006, 279, 79).

Thus, comparatively to citrate stabilized magnetic particles, the compatibility of MOEEAA-stabilized particles with the MELLF is higher.

The surface roughness of the silver coated ferrofluids was evaluated with a general purpose Zygo Mach-Zehnder interferometer. Magnetic deformations were induced by placing an electromagnetic coil, capable of generating magnetic fields of the order of a few Gauss, directly below the mirrors as described in Massart, R. *IEEE Trans. Magn.* 1981, *MAG-17*, 1247. An Imagine Optics Shack-Hartmann wavefront analyser was employed to measure the resulting surface deformation.

Interferometry measurements indicate that the reflective film forms a smooth surface with a root mean square roughness (RMS) of approximately λ/20 at 624 nm. Reflectivity of the film remained the same as reported for silver films spread on water. The reflectivity is typically around 60% in the visible and 80% in near infrared and beyond.

Figure 10:
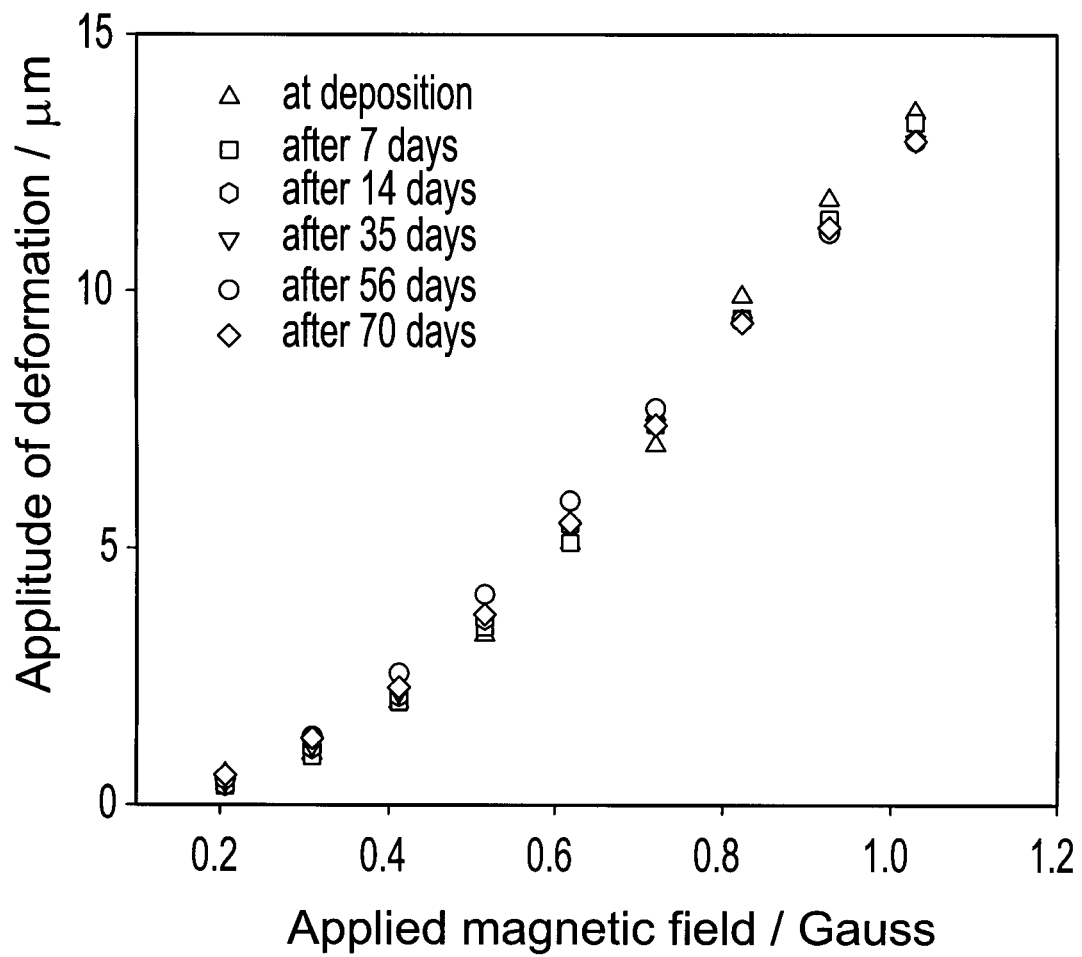
FIG. 10 is a graph showing peak-to-valley amplitude of deformation as a function of applied magnetic field for a liquid mirror prepared from an ethylene glycol based ferrofluid containing MOAAEE coated iron oxide nanoparticles and a thin film of silver nanoparticles deposited at the surface.

The stability of the liquid mirror was also investigated through repeated magnetic deformation over a period of three months. FIG. 10 shows that the magnetic response remains constant over this time period, further illustrating the compatibility between the surface film of silver particles and the ferrofluid.

While it is clear that the MOEEAA coated particles allow for the preparation of a ferrofluid that is compatible with the reflective silver surface layer, the reason for this cannot be unambiguously identified. The MOEEAA (non-ionic) and citrate (ionic) stabilized particles differ not only in the chemical nature of the ligand, but also in the sign of the electrostatic charge. The MOEEAA coated particles are positive, whereas those stabilized with citrate are negatively charged. Unfortunately, it is difficult to evaluate the electrostatic charge of the silver nanoparticles. Although negatively charged when initially prepared in aqueous solution, the particles spontaneously flocculate to form a surface film upon coating with an organic ligand (Gingras, J.; Déry, J. P.; Yockell-Lelièvre, H.; Borra, E. F.; Ritcey, A. M. *Colloids Surf., A* 2006, 279, 79). The expulsion of the particles from the aqueous phase during this step implies that their surface charge is significantly reduced. The sign of any residual charge, however, is unknown. If the silver particles carry a net positive charge, their compatibility with the MOEEAA stabilized ferrofluid could originate in electrostatic repulsions.

As noted above, the uncoated positively charged particles do not form a stable suspension in ethylene glycol. The presence of MOEEAA, even at a relatively low grafting density, allows for the preparation of a stable suspension. This ligand therefore clearly creates a repulsive barrier to particle aggregation and an increased affinity of the particles for the suspending medium. It is possible that the MOEEAA chains are also responsible for the screening of disruptive interactions between the magnetic nanoparticles of the ferrofluid and the silver particles spread at its surface.

A novel polar liquid based ferrofluid and, in an embodiment, an ethylene glycol based ferrofluid was prepared and characterized. This ferrofluid is compatible with a surface MELLF and thus suitable for the fabrication of magnetically deformable liquid mirrors.

Ethylene glycol was identified as an appropriate carrier liquid for a ferrofluid and thus for magnetically deformable mirrors. The relatively high surface tension of this liquid allows for the deposition of a stable reflective film of silver nanoparticles. Furthermore, the relatively low vapor pressure of ethylene glycol slows evaporation.

The ferrofluid also includes positively charged iron oxide nanoparticles, such as maghemite nanoparticles, coated with an organic ligand having a hydrophilic chain, such as and without being limitative, MOEEAA. The ferrofluid exhibit a magnetic response that is equivalent, or perhaps even superior to that found for corresponding citrate stabilized particles.

Unlike the uncoated particles, maghemite nanoparticles coated with MOEEAA and dispersed in ethylene glycol remained stable in the presence of a magnetic field. MOEEAA should exhibit a strong affinity for the carrier liquid (ethylene glycol) due to the ethoxy group (—O—$CH_2$—$CH_2$—) within the chain.

Infrared spectra indicate that surface grafting occurs through the terminal carboxylate group which is bound to the $\gamma$-$Fe_2O_3$ particles both through bridging and unidentate structures. A surface grafting density of 1.2 molecules/$nm^2$ is determined from thermogravimetry measurements. Although MOEEAA functionalization increases the stability of maghemite nanoparticle suspensions in ethylene glycol, surface charge is also important for the prevention of particle agglomeration.

Furthermore, the presence of the terminal carboxylate group ensures stable grafting to the magnetic iron oxide nanoparticles.

Importantly, the MOEEAA based system is compatible with the deposition of surface films of silver nanoparticles, allowing the preparation of magnetically deformable liquid mirrors. Such mirrors exhibit optical quality surfaces and magnetic performance that remains stable over 70 days. Corresponding mirrors supporting by ferrofluids composed of citrate coated nanoparticles exhibit dull non-reflecting surfaces with numerous cracks that appear shortly after the spreading of the reflective silver layer.

Optics and electronics are an enabling technologies. A large number of applications: telecommunications, projection systems, aspheric surfaces in optical systems (e.g. microscopes, telescopes, lithographic machines) can thus be foreseen for high-reflectivity mirrors. Moreover, the ferrofluid can be used as replacement for Micro Electro-Mechanical Systems (MEMS), which are used among others to redirect light in switches used in telecommunications.

Low-reflectivity optical elements, usually made of uncoated polished glass, are commonly used for optical-testing purposes. Magnetically shaped low-reflectivity liquids can be used for opthalmologic applications. They can generate surfaces having complex shapes that are known and can be used to determine the shape of the lens of the human eye, the crystalline lens. This allows the measurement of high-order aberrations (optical defects) of the crystalline lens so that they can be corrected with the appropriate medical procedure, for example, surgery (e.g. with a laser beam) that reshapes the lens. The magnetically shaped reference surface can further be used to verify the correction made to the lens of the eye before, during or after the procedure. In current surgical procedures, one only removes the defocus aberration (correct the focal length). The advantage of measuring and removing high-order aberrations is that the vision of the patient can be further improved. One can thus envision removing Coma, Astigmatism and even higher order aberrations.

The embodiments of the invention described above are intended to be exemplary only. The scope of the invention is therefore intended to be limited solely by the scope of the appended claims.

What is claimed is:

1. A process for the preparation of a magnetically deformable mirror, the process comprising the steps of:
    coating magnetic particles with an organic ligand having a hydrophilic chain;
    adding the ligand coated magnetic particles to a polar carrier liquid to create a ferrofluid including a suspension of the ligand coated magnetic particles in the polar carrier liquid, wherein the polar carrier liquid is a liquid selected from the group consisting of ethylene glycol, polyethylene glycol, glycerol, ionic liquids, and combinations thereof; and
    coating the ferrofluid with a reflective surface layer.

2. The process according to claim 1, wherein the hydrophilic chain of the organic ligand comprises an oxyethylene chain.

3. The process according to claim 1, wherein the organic ligand is a negatively-charged-terminated organic molecule.

4. The process according to claim 3, wherein the negatively-charged-terminated organic molecule is carboxylic acid-terminated polyethylene glycol.

5. The process according to claim 4, wherein the carboxylic acid-terminated polyethylene glycol has the chemical formula:

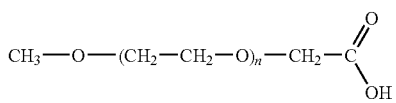

wherein n is an integer from 1 to 50.

6. The process according to claim 5, wherein the carboxylic acid-terminated polyethylene glycol is 2-[2-(2-methoxyethoxy)ethoxy]acetic acid.

7. The process according to claim 1, wherein the magnetic particles are nanoparticles comprising iron oxides.

8. The process according to claim 7, wherein the iron oxides comprise at least one of maghemite ($\gamma$-$Fe_2O_3$) and magnetite ($Fe_3O_4$).

9. The process according to claim 1, wherein the organic ligand is highly soluble in the polar carrier liquid.

10. The process according to claim 1, wherein the reflective surface layer comprises a reflective film of reflective metallic particles.

11. The process according to claim 10, wherein the metallic particles comprises silver nanoparticles.

12. A magnetically deformable mirror comprising a ferrofluid coated with a reflective surface layer wherein the ferrofluid comprises a suspension of magnetic particles in a polar carrier liquid wherein the particles are coated with an organic ligand having a hydrophilic chain, wherein the polar carrier liquid is a liquid selected from the group consisting of ethylene glycol, ethylene glycol, polyethylene glycol, glycerol, ionic liquids, and combinations thereof.

13. The magnetically deformable mirror according to claim 12, wherein the hydrophilic chain of the organic ligand comprises an oxyethylene chain.

14. The magnetically deformable mirror according to claim 12, wherein the organic ligand is a negatively-charged-terminated organic molecule.

15. The magnetically deformable mirror according to claim 14, wherein the negatively-charged-terminated organic molecule is carboxylic acid-terminated polyethylene glycol.

16. The magnetically deformable mirror according to claim 15, wherein the carboxylic acid-terminated polyethylene glycol has the chemical formula:

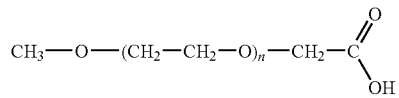

wherein n is an integer from 1 to 50.

17. The magnetically deformable mirror according to claim 16, wherein the carboxylic acid-terminated polyethylene glycol is 2-[2-(2-methoxyethoxy)ethoxy]acetic acid.

18. The magnetically deformable mirror according to claim 12, wherein the magnetic particles are nanoparticles comprising iron oxides.

19. The magnetically deformable mirror according to claim 18, wherein the iron oxides comprise at least one of maghemite ($\gamma$-$Fe_2O_3$) and magnetite ($Fe_3O_4$).

20. The magnetically deformable mirror according to claim 12, wherein the organic ligand is highly soluble in the polar carrier liquid.

21. The magnetically deformable mirror according to claim 12, wherein the reflective surface layer comprises a reflective film of reflective metallic particles.

22. The magnetically deformable mirror according to claim 21, wherein the metallic particles comprises silver nanoparticles.

23. A process for the preparation of a magnetically deformable mirror, the process comprising the steps of:
    coating magnetic particles with an organic ligand comprising an oxyethylene chain;

adding the ligand coated magnetic particles to a polar carrier liquid to create a ferrofluid including a suspension of the ligand coated magnetic particles in the polar carrier liquid; and coating the ferrofluid with a reflective surface layer.

24. A process for the preparation of a magnetically deformable mirror, the process comprising the steps of:

coating magnetic particles with a carboxylic acid-terminated polyethylene glycol;

adding the ligand coated magnetic particles to a polar carrier liquid to create a ferrofluid including a suspension of the ligand coated magnetic particles in the polar carrier liquid; and coating the ferrofluid with a reflective surface layer.

25. A magnetically deformable mirror comprising a ferrofluid coated with a reflective surface layer wherein the ferrofluid comprises a suspension of magnetic particles in a polar carrier liquid wherein the particles are coated with an organic ligand comprising an oxyethylene chain.

26. A magnetically deformable mirror comprising a ferrofluid coated with a reflective surface layer wherein the ferrofluid comprises a suspension of magnetic particles in a polar carrier liquid wherein the particles are coated with a carboxylic acid-terminated polyethylene glycol.

* * * * *